United States Patent
Jiang et al.

(10) Patent No.: US 7,630,812 B2
(45) Date of Patent: Dec. 8, 2009

(54) METHOD AND SYSTEM FOR CONTROLLING A TRANSFER CASE CLUTCH TO PROTECT AGAINST EXCESSIVE HEAT

(75) Inventors: Hong Jiang, Canton, MI (US); Bal Sankpal, Canton, MI (US); Steven Thomas, Bloomfield Hills, MI (US); Timothy Allen, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1224 days.

(21) Appl. No.: 10/774,805

(22) Filed: Feb. 9, 2004

(65) Prior Publication Data

US 2005/0177294 A1 Aug. 11, 2005

(51) Int. Cl.
*G06F 17/00* (2006.01)
*B60W 10/02* (2006.01)
(52) U.S. Cl. .............................. 701/68; 477/35; 477/174
(58) Field of Classification Search .................... 701/67, 701/69, 68; 73/118.1; 180/197, 233, 249; 477/35, 174, 176, 166
See application file for complete search history.

(56) References Cited

U.S. PATENT DOCUMENTS

| | | | | |
|---|---|---|---|---|
| 4,576,263 A | * | 3/1986 | Lane et al. | 477/72 |
| 5,060,747 A | * | 10/1991 | Eto | 180/197 |
| 5,319,963 A | * | 6/1994 | Benford | 73/118.1 |
| 5,809,443 A | | 9/1998 | Perttunen et al. | 701/69 |
| 5,954,778 A | | 9/1999 | Rodrigues et al. | 701/69 |
| 6,006,149 A | * | 12/1999 | Salecker et al. | 701/51 |
| 6,095,946 A | * | 8/2000 | Maguire et al. | 477/98 |
| 6,498,974 B1 | | 12/2002 | Rodrigues et al. | 701/69 |
| 6,568,256 B1 | | 5/2003 | Lee | 73/118.1 |
| 6,578,654 B2 | * | 6/2003 | Porter | 180/249 |
| 6,745,885 B2 | * | 6/2004 | Murakami et al. | 192/82 T |
| 6,752,742 B2 | * | 6/2004 | Shigeta et al. | 477/98 |

* cited by examiner

*Primary Examiner*—Jack W. Keith
*Assistant Examiner*—Edward Pipala
(74) *Attorney, Agent, or Firm*—David B. Kelley; MacMillan, Sobanski & Todd, LLC (57) ABSTRACT

In a motor vehicle driveline including a transfer case whose output is continually connected to a first output, a clutch, operating partially engaged, responds to a control signal to change the degree of clutch engagement, whereby a second output is connected driveably to the first output. A digital computer continually calculates a change in clutch temperature at frequent intervals and updates a running sum of clutch temperature changes. The control causes the clutch to more fully engage if the current calculated clutch temperature exceeds a predetermined reference clutch temperature.

11 Claims, 8 Drawing Sheets

METHOD AND SYSTEM FOR CONTROLLING A TRANSFER CASE CLUTCH TO PROTECT AGAINST EXCESSIVE HEAT

BACKGROUND OF INVENTION

1. Field of the Invention

This invention relates to the field of transfer cases for motor vehicles; more particularly it pertains to control strategies and systems for such transfer cases.

2. Description of the Prior Art

A transfer case is a device located in a motor vehicle drive line between the output of a geared power transmission and front and rear driveshafts for transmitting power to the wheels. A transfer case may include a planetary gear set that produces both a high range, in which the transfer case output is driven at the same speed as the input, and a low range, in which the output is driven slower than its input speed. The 4×2 and 4×4 states of the transfer case are usually selected manually by the vehicle operator by operating a lever or switch. A first position of the lever causes a range selection device in the transfer case to direct power from the transmission output to a rear drive axle, the 4×2-drive mode. A second position of the lever causes the transfer case to direct power to both a front drive axle and a rear drive axle, the 4×4-drive mode.

Certain transfer case control systems either fully engage or fully disengage the secondary driveshaft and the power source. A transfer case control system for all wheel drive operation transmits power continually and variably to the front and rear driveshafts. Various techniques are available for establishing the torque split or portion of the engine torque that is transmitted to the front and rear wheels. For example, a center differential mechanism continually divides torque at a fixed ratio between the front and rear wheels, perhaps 35% of torque to the front wheels and 65% to the rear wheels. But a center differential mechanism provides no variation of the torque division as needed to improve vehicle handling under certain drive conditions. A center differential usually includes a planetary gearset having an input, such as a sun gear driven by the transmission output, a first output such as a carrier connected to the rear driveshaft, and a second output such as ring gear connected to the front driveshaft.

A viscous coupling, located in parallel with the front and rear driveshafts, or the first and second outputs of a center differential, operates to mutually connect or couple the driveshafts in proportion to the speed difference between them. It produces this effect by shearing a viscous fluid located between closely spaced plates, one set of plates driven by the front driveshaft and a second set of plates driven by the rear driveshaft. Variations in the speed difference of the sets of plates increase the magnitude of the forces tending to maintain the plates at the same speed. The coupling dissipates a portion of the output power in the process of synchronizing the speeds of the front and rear driveshafts.

A hydraulically actuated clutch continually driveably connected to a primary driveshaft can be used to transmit a variable magnitude of torque to a secondary driveshaft. The magnitude of torque transmitted to the secondary shaft is controlled electronically to improve vehicle handling characteristics under certain drive conditions. However, a transfer case clutch of this type provides a torque split to input improves vehicle handling by operating partially engaged during lengthy service periods. This partial engagement or clutch slip causes the clutch to develop heat as it attempts continually to synchronize the speed of the clutch output and the input.

A portion of the power transmitted to the clutch is dissipated there by frictional contact between the friction discs and spacer plates of the clutch. The magnitude of power dissipated varies with clutch slip, clutch speed, and the magnitude of the friction force tending to engage the discs and spates, and the length of the period of clutch slip. Friction wears the surfaces of the plates and discs and affects performance of the clutch over time, particularly if the temperature of the clutch components and fluid becomes excessive.

There is a need, therefore, for a method, system and apparatus for controlling a transfer case clutch in a four-wheel drive vehicle such that the handling characteristics of the vehicle are improved by operating the clutch partially engaged, yet excess heat accumulation in the clutch is avoided predictably and reliably.

SUMMARY OF INVENTION

According to this invention, in a motor vehicle driveline that includes a transfer case whose output is continually connected to a first output, a clutch, operating partially engaged, responds to a control signal to change the degree of clutch engagement, whereby a second output is connected driveably to the first output. A digital computer continually calculates a change in clutch temperature at frequent intervals and updates a running sum of clutch temperature changes. The control causes the clutch to more fully engage if the current calculated clutch temperature exceeds a predetermined reference clutch temperature.

The control method and system of this invention provides higher clutch cooling capacity and, because of this, permits greater clutch slip. The control also provides precise clutch control capability especially at slower speeds. The static-to-dynamic friction characteristics of the friction material of the clutch are improved. The control strategy is operative when conditions are detected under which improved handling capability would benefit the vehicle operator.

In realizing these and other advantages, a method, according to this invention, for controlling a clutch that driveably connects an input and an output, includes the steps of operating the clutch partially engaged while torque is transmitted to the clutch input. The temperature of the clutch is calculated, and compared to a predetermined reference clutch temperature. If the calculated clutch temperature equals or exceeds the reference clutch temperature, then the degree of clutch engagement is increasing sufficiently to reduce the calculated temperature of the clutch.

Another embodiment of this invention contemplates a method for controlling, with the aid of a digital computer, a clutch through which a clutch input and a clutch output are driveably connected. The method includes inputting to, and executing in the computer a computer readable program code algorithm for operating the clutch partially engaged. The computer is provided with a data base including at lease a reference clutch temperature, and a signal indicating the beginning of the execution of the algorithm. The computer initializes a running arithmetic sum in response to the signal, and it repetitively calculates at frequent intervals, during execution of the algorithm, the change of temperature of the clutch during each interval. The computer repetitively updates the running sum with the calculated change of clutch temperature over each interval, and it repetitively compares the reference clutch temperature and the magnitude of the running sum. If the magnitude of the running sum equals or exceeds the reference clutch temperature, the computer issues a command causing an increase in the degree of clutch engagement sufficient to reduce the magnitude of the running sum.

DETAILED DESCRIPTION OF THE PREFERRED EMBODIMENT

Figure 1:
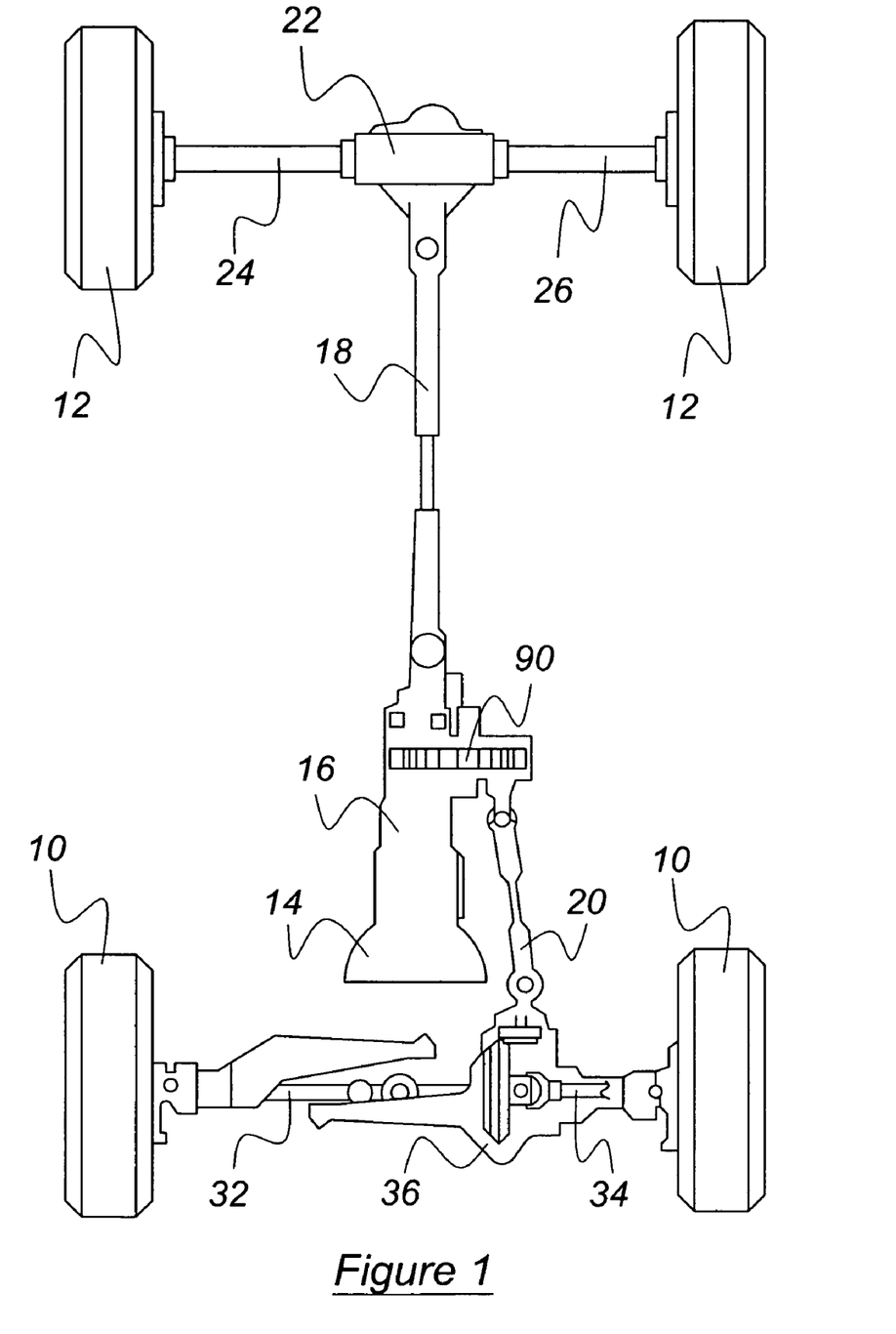
FIG. 1 is a top view of a motor vehicle driveline having a transmission, transfer case, and drive shafts extending to front wheels and rear wheels.

With reference now to the drawings and particularly to FIG. 1, the powertrain of a motor vehicle, to which the present invention can be applied, includes front and rear wheels 10, 12, a power transmission 14 for producing multiple forward and reverse speed ratios driven by an engine (not shown), and a transfer case 16 for continuously driveably connecting the transmission output to a rear drive shaft 18. The transfer case 16 selectively connects the transmission output to both the front drive shaft 20 and rear drive shaft 18 when a four wheel drive mode of operation is selected, either manually or electronically. Shaft 18 transmits power to a rear wheel differential mechanism 22, from which power is transmitted differentially to the rear wheels 12 through axle shafts 24, 26, which are contained within a differential housing. The front wheels are driveably connected to right-hand and left-hand axle shafts 32, 34, to which power is transmitted from the front drive shaft 20 through a front differential mechanism 36.

It should be appreciated that the terms "front" and "rear" are used herein for convenience purposes only, to refer to a secondary and primary driveshafts, respectively. In alternate embodiments of the invention, the front and rear driveshafts may be interchanged, e.g., the front driveshaft may act as the primary driveshaft.

Figure 2A:
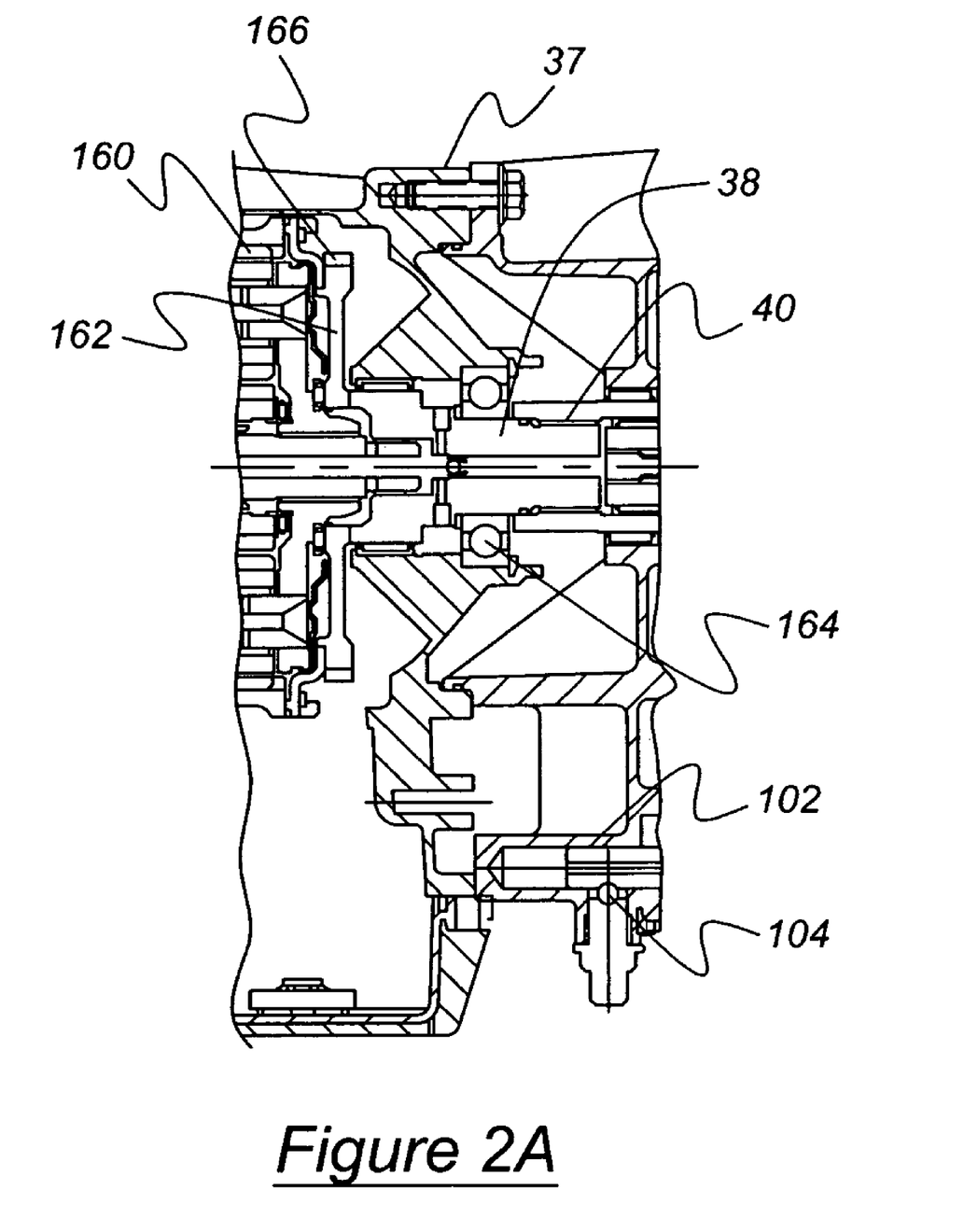
FIGS. 2A and 2B are left-hand and right-hand portions, respectively, of a cross sectional side view of a transfer case and a portion of an automatic transmission.
Figure 2B:
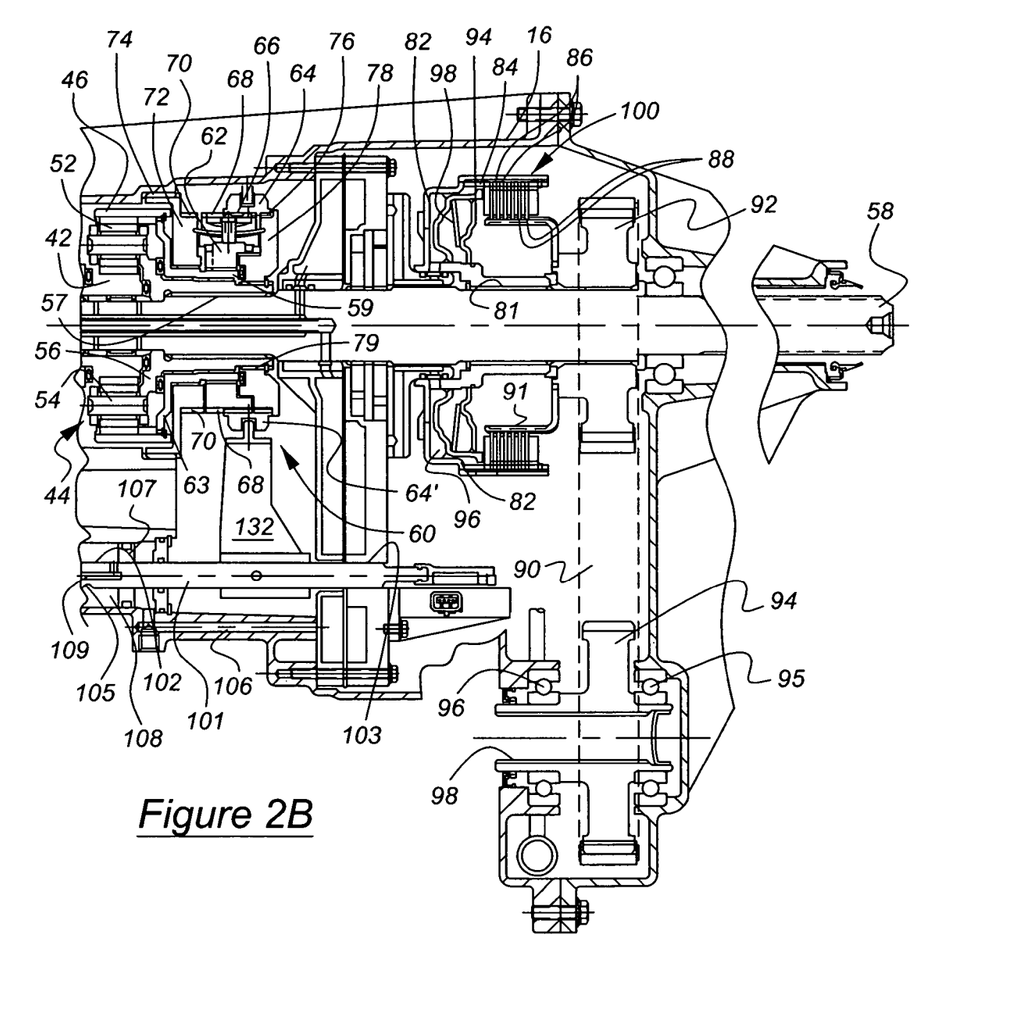

Referring now to FIGS. 2A and 2B, the output shaft 38 of the automatic transmission 14 extends through the transmission casing 37 into the casing 16 of the transfer case. Shaft 38 is driveably connected through a spline 40 to the sun gear 42 of a simple planetary gear set, an epicyclic train 44. Sun gear 42 is in continuous meshing engagement with a set of planet pinions 52, which are supported for a rotation on stub shafts 54, each stub shaft supported at opposite axial ends on a carrier 56. Each of the planet pinions 52 is in continuous meshing engagement with the sun gear 42 and a ring gear 46. Carrier 56 is driveably connected through spline 57 to the output 58 of the transfer case, which is adapted for connection to the rear driveshaft 18.

A high-low coupler 60 includes a hub 62, which is driveably connected through a spline 59 and radial disc 63 to ring gear 46. Coupler 60 includes a sleeve 64, formed on its inside surface with a system of axially directed spline teeth 66, engaged continuously with a system of spline teeth 68 formed on the outer surface of the hub 62. The sleeve 64 slides axially leftward and rightward on the hub. In FIG. 2, the coupler 60 shown above the axis of output shaft 58 is a synchronizer; the coupler shown below that axis is a dog clutch.

The teeth 66 of the sleeve 64 are engageable alternately with axially directed spline teeth 70 formed on a radially outer surface of a disc 72, which is continually fixed against a rotation by its engagement at 74 with teeth formed on the inner surface of the transfer case 16. The teeth 66 of sleeve 64 are engageable also with a system of axially directed spline teeth 76 formed on a radially outer surface of a disc 78.

Disc 78 is splined at 79 to carrier 56, which is splined at 57 to output shaft 58. Spline 81 driveably connects shaft 58 to a drum 82, which is formed on its inner surface with axially directed spline teeth 84. Spacer plates 86 are driveably engaged with the spline 84 of drum 82. Friction discs 88, interposed between adjacent spacer plates 86, are driveably engaged by spline teeth formed on the outer surface of an arm 91, which extends axially from a drive belt sprocket wheel 92.

Located within drum 82 is a hydraulically actuated piston 94, which moves axially in response to the pressurized and vented state of a hydraulic cylinder 96 located between drum 82 and piston 94. When cylinder 96 is pressurized, piston 94 moves rightward forcing the spacer plates 86 and friction discs 88 into mutual frictional engagement, thereby driveably connecting output 58 and sprocket wheel 92. When cylinder 96 is vented, piston 94 is moved leftward to the position shown in FIG. 2 due to a force applied to the piston by a Belleville spring 98, thereby driveably disconnecting output 58 and sprocket wheel 92. In this way, clutch 100 alternately driveably connects and disconnects output 58 and sprocket wheel 92.

When clutch 100 is engaged, power is transmitted to the forward drive shaft 20 from the output shaft 58 by a drive belt 90, which is continually engaged with sprocket wheel 92. Bearings 95, 96 rotatably support sprocket wheel 94 on the transfer case 16, and forward drive shaft 20 is driveably connected through a spline 98 formed on the inner surface of the sprocket wheel 94. In this way, when clutch 100 is engaged, output shaft 80 transmits power both to the rear drive shaft 18, which is connected by a universal joint to output shaft 80, and to the forward drive shaft 20.

In operation, drive shaft 20 is driven alternately at the same speed as that of the transmission output shaft 38, or shaft 20 is underdriven in relation to the speed of shaft 38, in accordance with the position of the coupler sleeve 64.

Carrier 56 is continually driveably connected to output shaft 58 through spline 57. Ring gear 46 is driveably connected to output shaft 58 through the torque delivery path that includes disc 63, coupler hub 62, coupler sleeve 64, disc 78 and splines 79, 57. Therefore, when sleeve 64 moves rightward to the position shown in FIG. 2, ring gear 46 and carrier 56 are mutually driveably connected, and ring gear 46, carrier 56 and output 58 are driven at the same speed as that of sun gear 42 and the input 38. This is the high-speed range.

When sleeve 64 of coupler 60 is moved leftward to produce a drive connection between disc 72 and coupler hub 62, ring gear 46 is fixed against rotation on the transfer case 16 through the torque path that includes disc 63, coupler hub 62, its sleeve 64 and disc 72. This provides a torque reaction and causes carrier 56 and output 58 to be underdriven in relation to the speed of sun gear 42 and shaft 38. This creates a low-range drive connection between transmission output 38 and the transfer case output 58.

Clutch 100 can be engaged regardless of the position of coupler sleeve 64 so that power is transmitted by the drive belt mechanism, which includes sprocket wheels 92, 94 and drive belt 90. In this way, both the forward drive shaft 20 and rear drive shaft 18 are driven alternately in the low-range and high-range, or only the rear drive shaft is driven in the low-range and high-range.

The transmission output 38 is driven by a ring gear 160, which is secured through a park gear 162 to output shaft 38. The park gear and shaft 38 are supported on the transmission case 37 by a bearing 164. The outer surface of the park gear is formed with teeth 166 separated by spaces adapted for engagement by a park mechanism.

Figure 3:
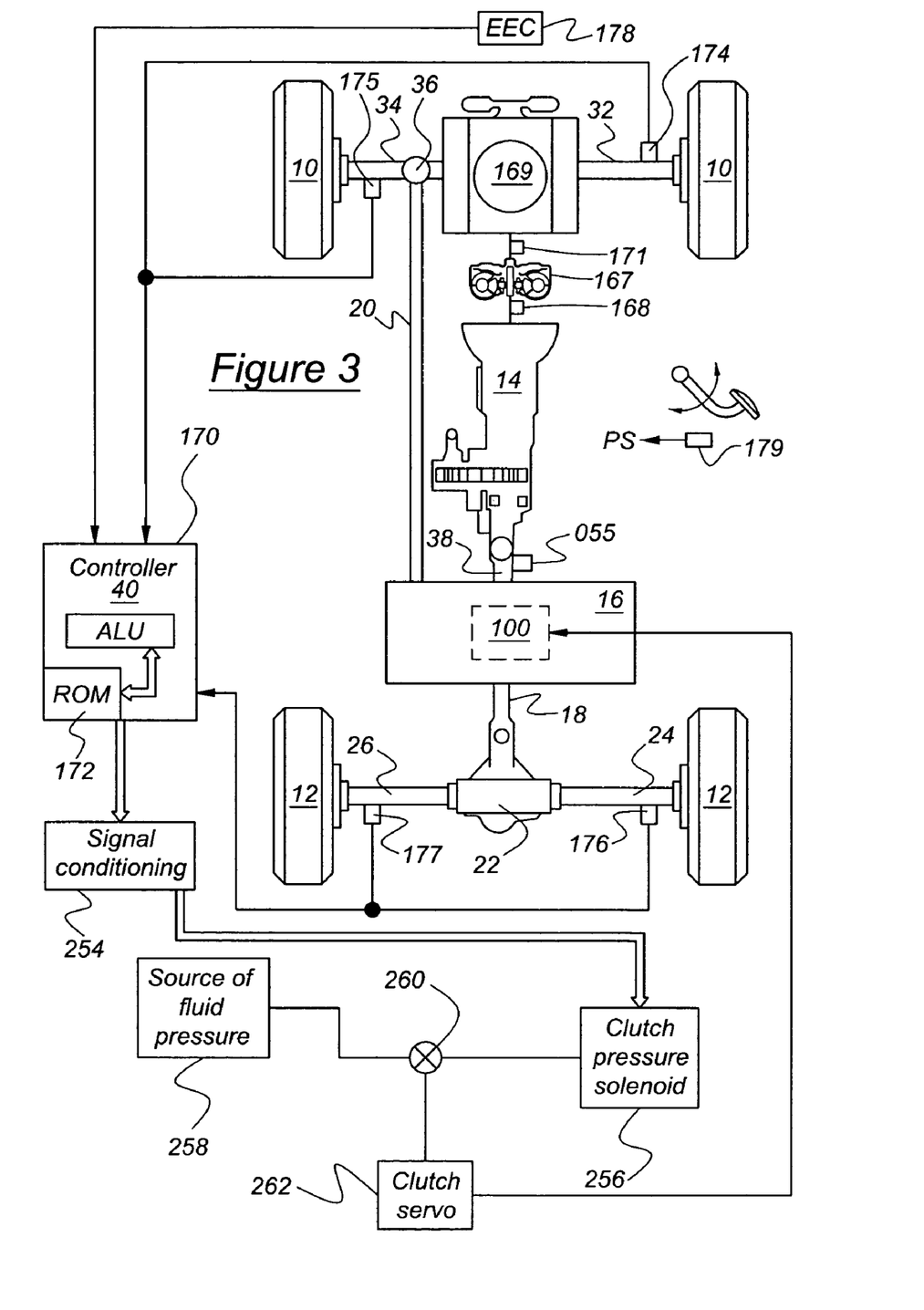
FIG. 3 is a schematic diagram of a system for controlling a transfer case clutch in a four-wheel drive vehicle.

Referring now to FIG. 3, there is shown a transfer case control system deployed in a four-wheel drive vehicle. Torque produced by the engine 169 is transmitted to the transfer case 16 at multiple speed ratios produced by an automatic transmission 14 located in the torque path between the engine 169 and transfer case 16. The rear drive shaft 18 is continually connected to the transfer case output 58, but clutch 100 transmits a variable portion of that input torque to the front driveshaft 20 in accordance with the degree to which clutch 100 is engaged. Clutch slip, the difference in speed of the rear driveshaft 18 and front driveshaft 20, is a measure of the degree of engagement of clutch 100.

The transfer case control system 10 includes a microcontroller or digital computer 170 operating under stored program control having a central processing unit that includes an arithmetic logic unit; electronic memory 172 containing control algorithms, data, functions, scalar values and routines for producing data and information representing current operating conditions of the powertrain; and input/output devices for acquiring, conditioning and transmitting signals produced by data sensors and control devices that respond to command signals generated by the computer. Controller 170 further includes continual data communication links among its CPU, ALU, I/O, memory, control algorithms and operational controls.

Controller 170 receives signals generated by sensors 144-148 and 171-168, processes and uses the input signals to determine the amount of torque to be transmitted to front and rear driveshafts 20, 18, respectively. Based upon this determination, controller 170 generates a command signal to activate the clutch 100, thereby selectively transmitting torque to the front driveshaft 20 from the transfer case output 58.

In the preferred embodiment, controller 170 is a powertrain controller that includes one or more digital microprocessors or digital computers, which cooperatively perform calculations, and execute subroutines and control algorithms. Controller 170 generates a variable force solenoid (VFS) command or output signal, which controls the amount of slippage between the friction discs and spacer plates of clutch 100, thereby controlling the relative magnitudes of torque and power transmitted to front driveshaft 22 from the output 58 and rear driveshaft 26. The duty cycle of the VFS signal is the percentage of the cycle time for which the signal is activated or enabled. The output signal of controller 170 is communicated to a variable force solenoid 256, which operates to open and close a source of fluid pressure 258 to a clutch servo 262, through which clutch cylinder 96 is alternately pressurized and vented. The clutch duty cycle is interchangeably referred to as a command, clutch output, and torque output.

In the preferred embodiment of the invention, memory 172 is a memory unit including both permanent and temporary memory, and at least a portion of the operating software that controls operation of controller 170. Moreover, memory 172 is adapted to selectively store other types of data or information, including data from prior control loop executions, processing data, and operational data. Examples of such data include, but are not limited to, data relating to the speed of driveshafts 18, 20, the difference in speed of driveshafts 18, 20, referred to as "delta shaft speed" or clutch slip, and engine operating data, which are used by controller 170 to determine the magnitude of torque currently produced by the engine 169, and torque that should be transmitted by clutch 100. Processor 170 also accesses information it uses to determine the current torque ratio of the torque converter 167 with reference to the speed ratio across the torque converter, which is determined from data produced by speed sensors 168, 171. Memory 172 also stores various functions, look-up tables, mathematical constants, threshold values, the state of various flags, and the number in the register of various counters and timers.

Right and left front wheel speed sensors 174, 175, and right and left rear wheel speed sensor 176, 177 are preferably speed sensors used in an anti-lock brake system (ABS). The speeds of the front sensors 174, 175 are averaged, filtered and forwarded to controller 170 from a ABS controller (not shown). Similarly, the speeds of the rear front sensors 176, 177 are averaged, filtered and forwarded to controller 170 from the (ABS) controller. Controller 170 determines the speed of the front driveshaft 20 and speed of the rear driveshaft 18 from the processed output produced by the wheel speed sensors.

Electronic engine control unit 178 includes sensors for producing signals representing engine operating parameters, which may include air mass flow rate, engine throttle position, barometric pressure, air charge temperature, spark timing, engine speed NE, fuel flow, cam timing and other information used as indices to determine current engine output torque from data stored in computer memory. Generally, information for determining current engine torque is stored in the form of look-up tables or regressive polynomials established by dynamometer testing of the engine.

In the preferred embodiment, the EEC 178 includes a throttle position sensor, which measures and/or detects the position of the engine throttle, and transmits a signal representing this position to controller 170. EEC 178 may include one or more conventional engine, vehicle speed and/or acceleration sensors, and one or more fault detection sensors, which detect faults or abnormalities in the operation of engine 169 or in the operation of the other components of vehicle. With reference to current engine operating condition data, EEC 178 continually produces a signal representing current engine output torque and throttle position, which signals are received as input by the controller 170. In addition, a foot brake switch 179 produces a high or low signal representing the state of the foot brake. Alternatively, a brake position sensor continually produces an input signal representing the current position of the foot brake pedal operated manually by the vehicle operator. The EEC 178 transmits the signal produced by sensor 179 also to the controller 170.

Right and left front wheel speed sensors 174, 175, and right and left rear wheel speed sensor 176, 177 are preferably speed sensors used in an anti-lock brake system (ABS). The speeds of the front sensors 174, 175 are averaged, filtered and forwarded to controller 170 from a ABS controller (not shown). Similarly, the speeds of the rear front sensors 176, 177 are averaged, filtered and forwarded to controller 170 from the (ABS) controller. Controller 170 determines the speed of the front driveshaft 20 and speed of the rear driveshaft 18 from the processed output produced by the wheel speed sensors.

Figure 4A:
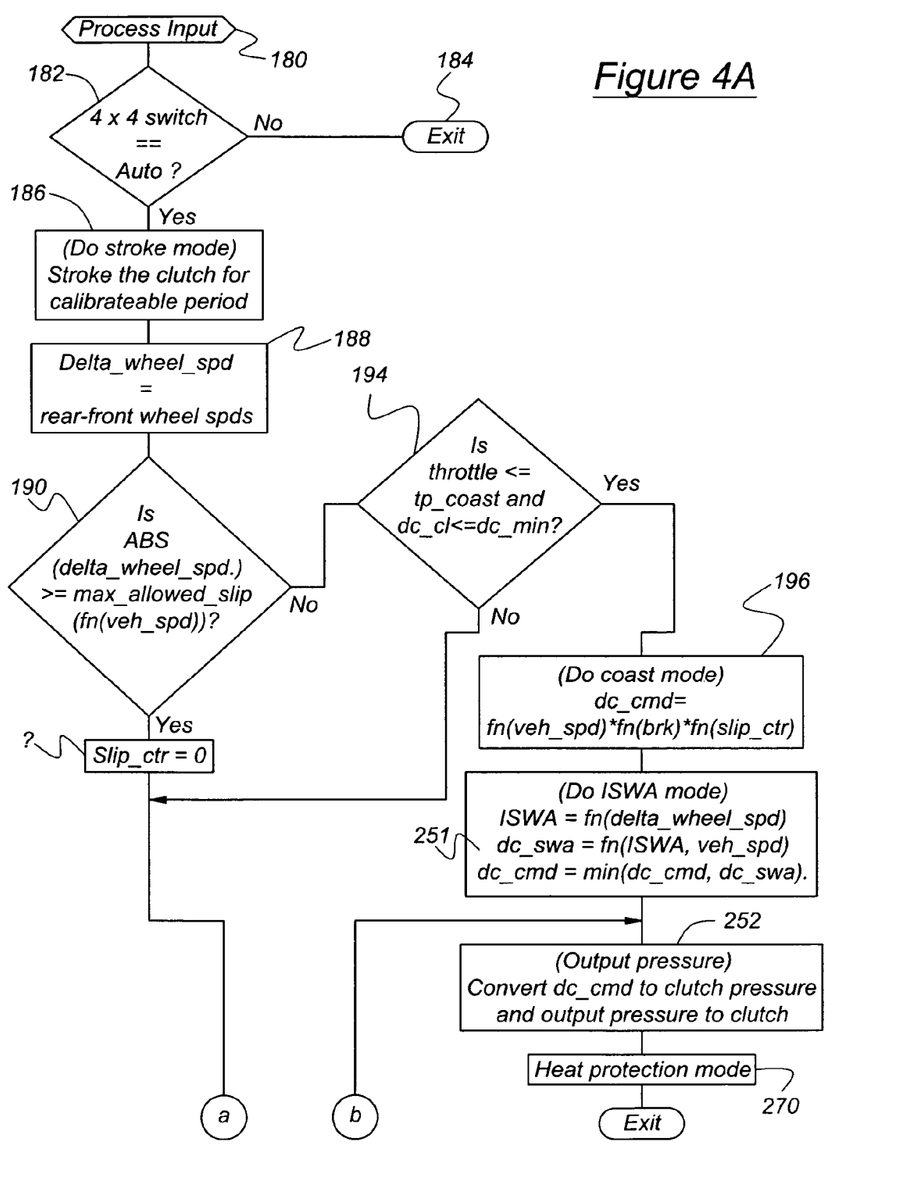
FIG. 4 is a block diagram showing the steps for controlling a transfer case clutch.
Figure 4B:
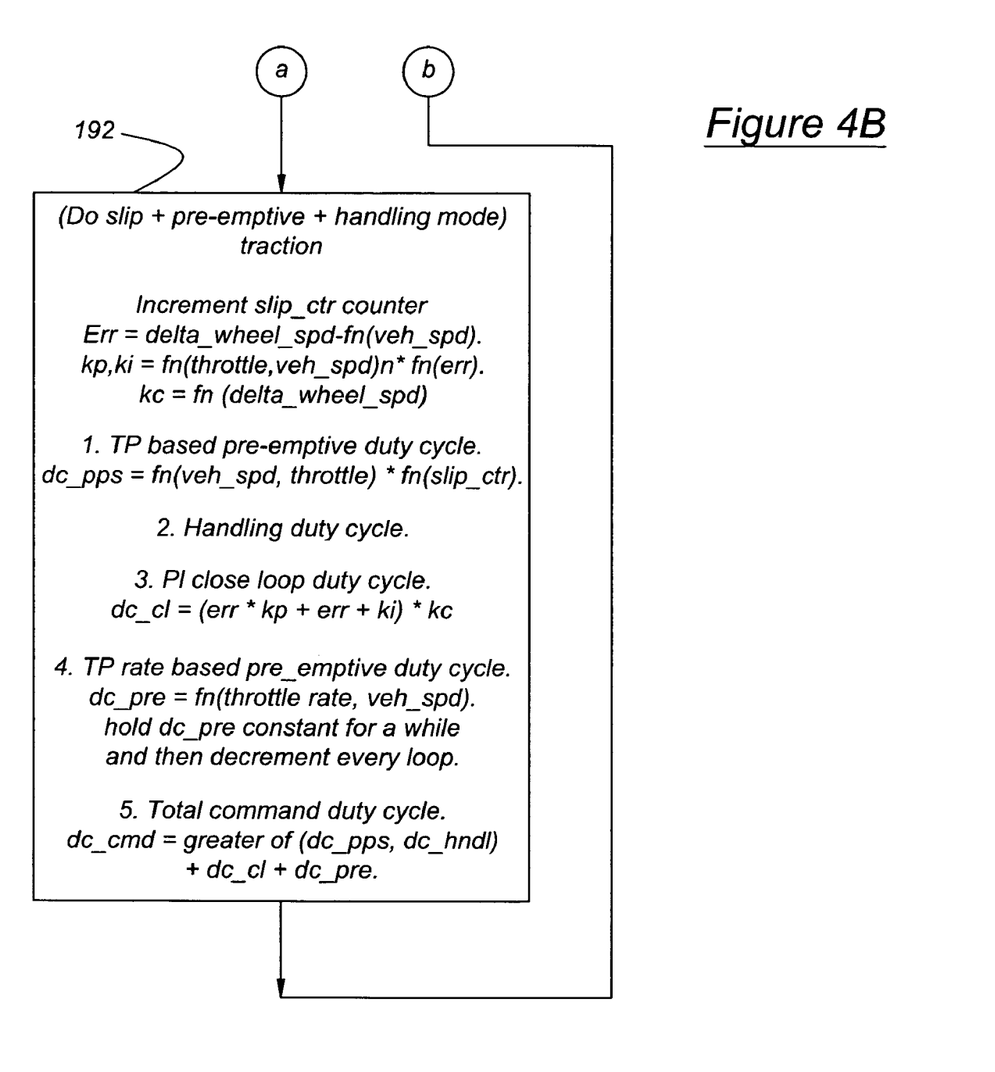

Referring now to the strategy for controlling operation of clutch 100 illustrated in the logic flow diagram of FIG. 4, at step 180 controller 170 receives and processes the data representing shaft speed, and determines the speeds of the front driveshaft 20 and/or wheels 10 and the rear driveshaft 18 and/or wheels 12.

At 182, the position of a 4×4 switch, manually controlled by the vehicle operator, is read to determine whether the switch is in the "auto" position, which indicates that clutch is controlled automatically by the strategy of this invention. If the operator sets the switch to any other of the selectable positions (4×2, 4×4 Low, and 4×4 High), the control exits the clutch strategy at 184. When either 4×4 High or 4×4 Low are selected, clutch 100 is fully locked or engaged by pressuring the clutch servo sufficiently to engage the clutch. When the 4×2 range is selected, clutch 100 is open or disengaged by venting its servo. The status of the 4×4 switch is tested during each execution of the control algorithm, each loop having a period of about loop 8 mS.

Provided the transmission range selector or PRNDL is in the D or R range, and if the inquiry at step 182 is true or high, control passes to step 186, which produces a VFS signal that strokes clutch 100 for a calibratable period. Preferably line pressure normally in the range 60-80 psi., is boosted for about 150 mS, and the clutch pressure is maintained thereafter at 20 psi., the steady state clutch pressure magnitude or reference clutch pressure magnitude.

Reference to "calibratable or calibrated" means a scalar or function whose value is a predetermined magnitude, which can be changed or calibrated by altering the control algorithm to tune or produce a desired performance characteristic. Calibrated function values are stored in memory, the currently magnitudes of which are determined from a look-up table with reference to another variable or a set of variables, the arguments or indexes of the function.

Next at step 188, controller 170 calculates clutch slip or delta shaft speed by subtracting the speed of the front driveshaft 20 (front shaft speed) from the speed of the rear driveshaft 18 (rear shaft speed).

At step 190, the controller 170 determines whether the absolute difference in speed of the front shaft speed and rear shaft is greater than a predetermined, reference slip magnitude. The reference magnitude of slip is stored in a slip look-up table in memory 172. The look-up table includes slip values, speed values, each of which corresponds to a particular vehicle speed or range of vehicle speeds, and represents a magnitude of slip considered allowable at a particular vehicle speed or range of vehicle speeds. The current vehicle speed is used to index or reference the look-up table, thereby providing a reference slip value.

If the current slip exceeds the maximum allowed or reference slip, indicating that slip is high, the control algorithm moves to a module 192 of clutch control routines (slip mode, preemptive mode, closed loop mode, and handling mode), which are then executed.

If the current slip is equal to or less the maximum allowed slip or reference slip, control passes to step 194. A dual test is made at step 194. First, the current throttle position (THROTTLE), a counted number of clicks or another signal representing the extent to which the throttle pedal is depressed, is compared to a coast throttle position (TP_COAST), a calibrated value, to determine whether THROTTLE is equal to or less than TP_COAST. A preferred value for TP_COAST is about 5-10% of full throttle. Second, the current clutch duty cycle (dc_cl) is compared to a minimum clutch duty cycle value (DC_MIN), a calibrated value, to determine whether dc_cl is equal to or less than DC_MIN. A preferred value for DC_MIN is about 2-5%. If both these tests are false, indicating both that the operator is demanding a high magnitude of engine torque and the commanded clutch pressure is high, even though the vehicle is in a low slip condition, control passes to step 192. If step 194 is true, control passes to step 196, where coast mode control is executed.

If a change in transmission gear ratio is in progress, represented by the current presence of a flag indicating that a command has issued from a transmission controller for a ratio change and the ratio changes has not been completed, clutch pressure increases at a calibrated linearly rate, holds at a calibrated duty cycle for a calibrated period, and then decreases at a linear calibrated rate.

Upon entering module 192, at step 200 the counter, SLIP_CTR, is incremented after each execution loop of the control algorithm, thereby keeping an updated count of the number of execution loops of module 192, or length of time the control system 167 remains in module 192.

At step 202, controller 170 calculates an error signal ERR(k) by subtracting Max_Allowable_Slip, a calibrated function of vehicle speed (VEH_SPD), from DELTA WHEEL SPEED (DELTA_WHEEL_SPD) or slip. In performing this calculation, the allowable slip factor is selected by way of a rear slip table, which includes a plurality of "allowable slip" values (e.g., speed values), each corresponding to a particular rear shaft speed value or range of values, and each representing an amount of relative slip that is considered to be allowable at a particular speed or range of speeds. The current rear shaft speed is used to index the table, thereby providing a corresponding allowable slip value. In one non-limiting embodiment, the control system 167 determines whether the wheels 10, 12 have differing effective diameters. If such a condition exists, controller 170 increases the allowable slip value by an offset factor or value, thereby compensating for the differing effective diameters of the wheels.

Controller 170 processes the wheel speeds produced by sensors 174-177 and determines from those signals the speeds of the front driveshaft 20 and rear driveshaft 18.

Preparatory to executing a closed loop control to determine a slip control signal (dc_cl), proportional and integral (PI) constant values are determined. The PI signal y(k) is calculated by use of the following equation:

$$y(k)=Yp(k)+Yi(k) \qquad \text{Eq. 1)}$$

wherein k represents the current iteration of the calculation, Yi(k) is the integral term or component, and Yp(k) is the proportional term or component. The integral term is derived by use of the following equation:

$$Yi(k)=Yi(k-1)+[T*Ki]*ERR(k) \qquad \text{Eq. 2)}$$

wherein T represents the time interval between iterations of the calculation, Ki is equal to an integral gain constant, and ERR(k).

The proportional term is calculated by use of the following equation:

$$Yp(k)=Kp*ERR(k) \qquad \text{(Eq. 3)}$$

wherein Kp is a proportional gain constant.

After the error signal ERR(k) is calculated at step 202, the controller 170 proceeds to step 204 and selects a value for the proportional gain constant Kp. Values of Kp are the product of a function stored in memory indexed by current throttle position (THROTTLE) and current vehicle speed (VEH_SPD), and a stored function indexed by ERR.

$$Kp=FN(\text{THROTTLE,VEH\_SPD})*FN(\text{ERR}(k))$$

In the preferred embodiment of the invention, Kp is set or made equal to a "down" gain value "Kp—DN" if e(k) is less than zero, which indicates that the torque provided to the front driveshaft 20 should be reduced, and is set or made equal to a "up" gain value "Kp—UP" if e(k) is greater than zero, which indicates the torque provided to front driveshaft 20 should be increased. By selectively using two separate proportional gain constant values Kp—UP and Kp—DN, system 167 is able to substantially reduce noise, vibration and harshness without compromising system response time.

Similarly at step 204, controller 170 determines a value for the integral gain constant Ki. Values of Ki are the product of a function stored in memory indexed by current throttle position (THROTTLE) and current vehicle speed (VEH_SPD), and a stored function indexed by ERR.

$$Ki=FN(THROTTLE,VEH\_SPD)*FN(ERR(k))$$

After the values of the integral and proportional constant terms Ki and Kp have been determined, at step 205 a constant Kc is determined from a look-up table stored in memory containing values indexed by DELTA_WHEEL_SPEED, the difference in speed between the front and rear wheels 10,12 determine at step 188.

Kc is the overall gain of the PID controller, and is useful especially in calibrating the powertrain for increasing the effect of the controller without having to alter individual the values of the individual PID gains.

Next, at step 208, the closed loop clutch duty cycle is calculated from the following equation and stored in memory:

$$dc\_cl=(ERR(k)*Kp+ERR(k)*Ki)*Kc$$

A preemptive throttle position based clutch duty cycle (dc_pps) is determined next at step 210 with reference to the position of the engine throttle, or the position of the throttle paddle. When vehicle speed is high and the transmission is operating in a high gear ratio, if the vehicle operator then tips into the throttle, i.e., increases the extent to which the engine throttle is opened, a low magnitude of torque at the front wheels is required to prevent or preempt wheel slip. However, when vehicle speed is low and the transmission is operating in a low gear ratio, if the vehicle operator then tips into the throttle, a relatively high magnitude of torque at the front wheels is required to prevent wheel slip. A first function stored in memory, whose arguments or indices are vehicle speed and throttle position, is established by calibration to control operation of the clutch 100 under the drive conditions described above. Accordingly, the values of that function, FN(VEH_SPD, THROTTLE), decrease with increasing vehicle speed and increase with increasing throttle position.

However, it is undesirable to overload the front wheels 10 with high torque for an extended period. Therefore, the preemptive clutch duty cycle determined with reference to the first function, FN(VEH_SPD, THROTTLE), is held only for a brief period, after which it is reduced to a steady state duty cycle, which is approximately zero percent. A second function, FN (SLIP_CTR), is a shaping function for progressively reducing the duty cycle generated by the first function. The value of SLIP_CTR, a count of the number of execution loops the control has been in the slip control mode of module 192, is a measure of the length of the period since the control algorithm entered the slip control mode. The magnitude of second function, indexed by the count within the current slip counter, SLIP_CNT, varies inversely with the magnitude of the slip counter. In this way, dc_pps declines as the duration of the slip mode increases. During the occurrence of a slip condition, the control relies principally on the closed loop control, to compensate for slip, rather than the throttle-based slip preemption control strategy.

The throttle position-based preemptive clutch duty cycle (dc_pps) is determined from the following equation:

$$dc\_pps=FN(VEH\_SPD,THROTTLE)*FN(SLIP\_CTR)$$

A preemptive throttle rate based clutch duty cycle (dc_pre) is determined next at step 212 with reference to the time rate of change of the engine throttle position, or, as it is called in connection with IR vehicles, the position of the throttle paddle. When throttle rate is high, either due to a throttle tip-in or back-out, i.e., movement of the throttle tending to open or close the throttle, a relatively high magnitude of torque at the front wheels is required to prevent or preempt slip. However, when the throttle rate is low, a relatively low magnitude of torque at the front wheels is required to prevent slip due to the inertia of the engine and transmission. At low vehicle speed with the transmission operating in a low gear ratio, a relatively high magnitude of torque at the front wheels is required to prevent slip. A duty cycle function stored in memory, whose arguments or indices are vehicle speed and throttle rate, is established by calibration. Accordingly, the values of that function, FN(THROTTLE RATE, VEH_SPD), vary directly with throttle rate and inversely with vehicle speed.

However, it is difficult to rely on throttle position alone to control slip following a tip-in condition. For example, if the throttle position changes from 0% to 20% in 100 mS, a 200% change of throttle position per second, it has been discovered that it is preferred to maintain the duty cycle magnitude produced by the function FN(THROTTLE RATE, VEH_SPD) for a calibratable hold period of about 200-500 mS, and then decrease the duty cycle at a rate that decreases with time. The control strategy of this invention continually compares the current duty cycle to the base duty cycle and continually decreases the current duty cycle at a rate that increase with time. For example, after the hold period, dc_pre may be reduced by 3% after the first execution loop, approximately 8 mS. Then it may be decreased by 2% after the second execution loop, and by 1.5% after the third execution loop, etc. In this way, dc_pre quickly declines when dc_pre is substantially larger than the steady state or reference clutch duty cycle, and dc_pre declines more slowly as dc_pre approaches the steady state or reference clutch duty cycle.

The throttle rate-based preemptive clutch duty cycle (dc_pps) is determined from the following equation:

$$dc\_pre=FN(THROTTLE\ RATE,VEH\_SPD)*FN(SLIP\_CTR).$$

The throttle rate duty cycle is decremented or shaped on the basis of the following function:

$$FN(dc\_cmd,dc\_base)$$

Also located in the module 192 of control algorithms is a handling mode program entered at step 214 and executed in series with steps 200-212. A principal purpose of the handling mode is to maintain clutch 100 in a slip condition, i.e., partially engaged, but not fully engaged. A portion of the torque produced at the transmission output 38 is transmitted through the transfer case output 58 directly to the rear driveshaft 18 and rear wheels 12, and a portion of that torque is transmitted through clutch 100 and drive chain 90 to the front driveshaft 20 and front wheels 10. The relative magnitudes of those torque portions is determined by the degree of slip, the extent to which clutch 100 is fully engaged.

The duty cycle produced by the control algorithm, dc_hndl, determines the magnitude of clutch slip during the handling mode. The handling mode control strategy decreases pressure to clutch 100 if the clutch is locked, and it simulates the functional characteristics of a center differential and viscous coupling.

Figure 5:
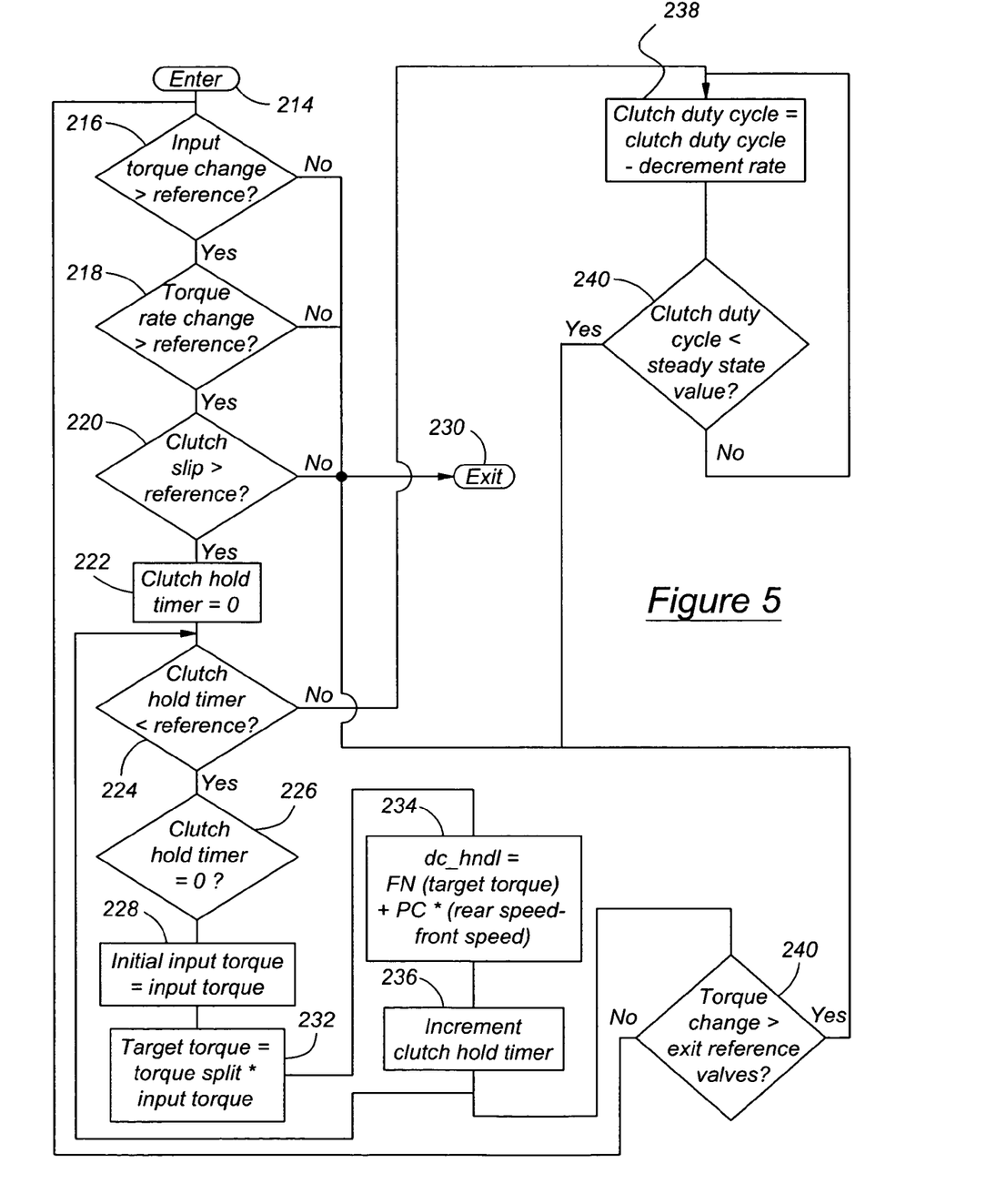
FIG. 5 is a block diagram showing the steps for controlling a transfer case clutch in a handling mode condition.

The handling mode control is illustrated in detail in FIG. 5. Tests are made first at steps 216, 218, 220 to determine whether the handling mode should be executed. The torque at the transfer case input 38 is calculated as the product resulting from multiplying the current engine torque, the current torque ratio of the torque converter, and the current gear ratio of the transmission. Current engine torque is determined with reference to inferred engine output torque. The current torque ratio produced by the torque converter, which is located in the driveline between the engine 169 and the transmission input shaft, is determined from the torque converter current speed ratio. The current gear ratio of the transmission is calculated from the speed of the transmission output shaft OSS 38 and speed of the transmission input shaft, the torque converter turbine speed. Speed sensors 168, 171 and OSS produce signals representing the speed of the turbine, engine and transmission output, respectively.

At step 216, a first test, used to determine whether the handling mode should be executed, is a comparison of the difference between current torque at the transfer case input and initial in put torque at the beginning of the current execution loop. If that difference is greater than a predetermined threshold, a calibrated constant stored in computer memory 172, then the first test is true, and control passes to step 218.

A second test 218 compares the time rate of change of input torque to a reset threshold, a calibrated constant. A third test 220 is determined from the difference between the speed of the transfer case output shaft, which is directly connected to the rear drive shaft, and the speed of the front drive shaft. This speed difference represents the slip across the clutch. If this speed difference exceeds another calibrated reset threshold, then the third test is true. If either of the first, second or third test is true, then the handling mode is entered because the vehicle drive line is in a dynamic state of torque change, to which the handling mode is adapted.

A clutch hold timer is set equal to zero at 222 upon entering the handling mode, whereupon the timer begins a count representing the length of a period since the beginning of the current handling mode execution. Continually during execution of the handling mode the count within a clutch hold timer is compared at 224 to a threshold count, a calibrated reference value representative of a recent occurrence of a dynamic state of torque change. If the clutch hold timer count is less than the threshold count, indicating that an insufficient amount of time has passed since the last occurrence of a dynamic event, the handling mode execution continues. Otherwise, control passes to step 238.

If at test 220, the clutch hold timer exceeds the reference time, which would indicates a dynamic change of torque has not occurred recently, the handling mode strategy concludes that the transfer case is operating in a steady state mode. Consequently the clutch duty cycle is recalculated at 238 as the current duty cycle minus a calibrated decrement rate. The clutch duty cycle is continually reduced in this way until the clutch duty cycle becomes less than the steady state clutch duty cycle at test 240, whereupon the handling mode strategy is exited at 230.

If the clutch hold timer is equal to zero, the test at step 226, then initial input torque is set equal to the current input torque and that value is saved at 228 in memory 172. If the clutch hold timer is equal to zero, indicating that the current execution loop is the first loop to be executed since entering the handling mode, then at 228 initial_InputTorque=input torque.

Next at 232 a target torque, representing the portion of the input torque that is to be transmitted from the transfer case output through clutch 100 to the forward drive shaft 20, is determined with reference to a predetermined, calibrated torque split scalar. Target torque is equal to the torque split scalar multiplied by input torque.

Then the handling mode clutch duty cycle is calculated at 234. First, a look-up function of linearized clutch duty cycle values, each value corresponding to the torque transmitted by clutch 100 at the duty cycle, is indexed by the current target-Torque value from step 232 to determine a clutch duty cycle. The value of this clutch duty cycle simulates the clutch torque that would be produced by a transfer case center differential.

The second term of the clutch duty cycle summation simulates the performance of a viscous coupling by increasing the magnitude of the hydraulic pressure sent to the clutch in proportion to the amount of current slip across the clutch 100. The proportional control component is the product of a proportional constant and the magnitude of clutch slip, i.e., the difference between the speed of the rear drive shaft and the speed of the front drive shaft.

Accordingly, either a constant, Proportional Constant, or a look-up table of such values, is multiplied by the slip across clutch 100. The difference between the speed of the rear driveshaft 18 and the speed of the front driveshaft 20, (RearSpeed−FrontSpeed) is the slip across the clutch. The handling mode clutch duty cycle is calculated from the following equation:

$$dc\_hndl = FN(\text{target Torque}) + \text{Proportional Constant} * (\text{Rear Speed} - \text{Front Speed}))$$

After the clutch duty cycle is calculated in this way, the clutch hold timer is incremented at 236 each time the handling mode strategy is executed. The handling mode is repeatedly executed as long as the clutchHoldTimer count is less than the reference at step 224. When the clutchHoldTimer count exceed the reference count, control passes to step 238, and the clutch pressure is reduced steadily until its corresponding clutch duty cycle magnitude becomes less than the steady state clutch duty cycle magnitude, whereupon the handling mode is exited. During the steady state condition, the pressure at clutch 100 is no longer decreased, but is held at a positive, low-pressure magnitude.

The handling mode strategy is reentered if any of the tests at 240 is true. If the difference between input torque and initial input torque exceeds an exit trigger Threshold, or the time rate of torque change over a calibrated period is greater than an exit trigger Threshold, or clutch slip exceeds an exit trigger Threshold, then control passes to step 214, and the handling mode is reactivated. Preferably the exit trigger thresholds that lead to an exit of the handling mode strategy are somewhat higher that the reset thresholds used to enter the handling mode.

After executing the slip mode, preemptive mode, handling mode and closed loop algorithms of module 192, as described, the controller 170 determines the commanded clutch duty cycle by comparing at 250 the duty cycle values dc_pps, dc_hndl, dc_cl and dc_pre. The computer then establishes a commanded duty cycle signal, dc_cmd, the largest of the duty cycle values generated by executing the slip mode, preemptive mode, handling mode and closed loop mode algorithms. This commanded duty cycle is passed to step 252 for subsequent processing.

Returning again to FIG. 4, if the test at step 194 is true, indicating that the vehicle is at high speed, a low magnitude of engine torque is required, and the clutch duty cycle is at a low magnitude, the coast or engine braking mode algorithm is executed at 196. During a coast condition, the transmission operates in a high gear ratio; therefore, engine braking is present. But engine braking applies a negative torque to the rear wheels due to engine and transmission inertia. This negative torque would slow the rear wheels relative to the front wheels tending to destabilize the vehicle's rear. To avoid this condition, clutch 100 is applied or engaged during an engine braking condition by a coast mode control algorithm.

An engine braking condition is detected when test 194 is true. A clutch duty cycle for the coast mode is determined at 196. A first function (FN(VEH_SPD)) containing calibrated clutch duty cycle values indexed by vehicle speed is established such that the first function's values increase with vehicle speed. A second function (FN(BRK)) containing calibrated values indexed by the state of the foot brake pedal is established such that the second function's values increase when the brake pedal is displaced from a reference position. A third function (FN(SLIP_CTR)) containing calibrated values indexed by the value of the slip counter is established such that the third function's value changes inversely with the slip counter value. In this way, the magnitude of the function decreases steadily as the length of the clutch slip condition period increases. Alternately, when a foot brake sensor of the type that indicates the pedal displacement from a reference position is used, a second function (FN(BRK)) containing calibrated values-indexed by the degree of foot brake pedal displacement is established such that the second function's values increases with brake pedal displacement.

The effect of the second function is to decrease the negative engine braking torque applied to the rear wheels, and to slow the front wheels by increasing the negative engine braking torque applied to the front wheels. These actions are increased if and to the extent the vehicle operator displaces the foot brake depending on the nature of the brake pedal sensor that is used. The effect of the third function is to decrease the magnitude of the coast mode clutch duty cycle steadily as the length of the clutch slip condition period increases during an engine braking condition.

If output from a steering wheel angle sensor is available, then at 251 the actual steering wheel angle is determined. Otherwise, the steering wheel angle is inferred using the ISWA technique described in U.S. Pat. No. 6,498,975, which is incorporated herein by reference and is owned by the assignee of this invention. The command value dc_swa is determined from a stored function indexed by ISWA or actual steering wheel angle, if available, and vehicle speed. The commanded VFS magnitude is clipped to a maximum value in accordance with the value of dc_cmd, obtained from a stored function indexed by the current dc_cmd and dc_swa. The final dc_cmd value is transmitted to the variable force solenoid 256 by controller 170.

At step 252, the controller 170 produces a final commanded duty cycle, dc_cmd, by comparing the duty cycle value generated at step 250 following execution of the slip mode, preemptive mode, handling mode and closed loop mode algorithms to the coast mode clutch duty cycle value. The computer then assigns to the commanded duty cycle, dc_cmd, the larger of these clutch duty cycle values, and issues a command representing the final clutch duty cycle value.

The commanded duty cycle signal is carried as input to a signal conditioning circuit 254, whose corresponding output is a pulse width modulated VFS signal applied to a solenoid 256. A fluid pressure source 258 is connected through a valve 260 controlled by solenoid 256. Valve 260 opens and closes a connection between the fluid pressure source 258 and a hydraulic servo 262 in response to the VFS signal. The pressure at servo determines the degree of engagement of clutch 100 by controlling the force between the clutch spacer plates 88 and clutch friction discs 86. In this way, the clutch slip is controlled in response to the commanded clutch duty cycle signal (dc_cmd) produced by the controller 170. The final commanded clutch duty cycle is the result of the several duty cycle values resulting from the slip mode, preemptive mode, closed loop control, handling mode, and coast mode.

Figure 6:
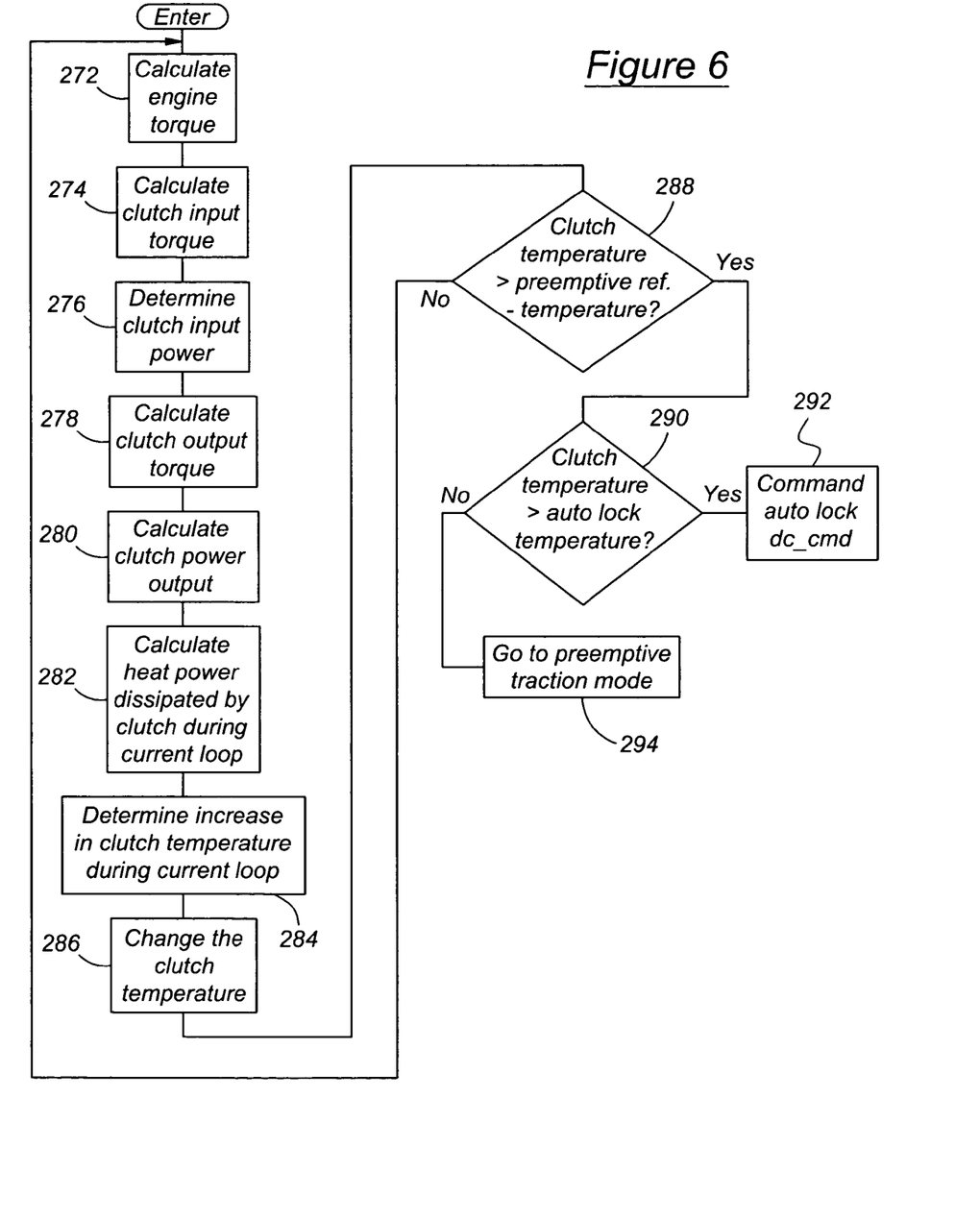
FIG. 6 is a block diagram showing the steps for controlling a transfer case clutch to protect against overheating.

A technique is provided to protect clutch 100 against excessive heat produced by dissipating energy while changing the duty cycle of the clutch in response to the commanded duty cycle. The clutch heat protection mode is executed at step 270. The heat protection control continuously determines the operating temperature of the transfer case. The control disables the handling mode 214 and directs control to the preemptive traction mode 210, 212 when a calculated clutch temperature exceeds a first threshold temperature. Alternatively, if the temperature of the calculated transfer case produced by the control is greater than a second threshold, the heat protection control commands an auto-lock mode, which fully locks or engages the transfer case clutch 100, causing the transfer case to operate in the four wheel drive high range, 4×4 High.

The output torque of the transmission is equal to the transfer case input torque due to the direct connection of the transmission output shaft 38 to the transfer case input, as shown in FIG. 2. Engine output torque is inferred at step 272 by the EEC 178 from the engine operating parameters and either a regressive polynomial or a function of engine torque stored in the EEC 178 and indexed by the current engine operating parameters, as described above.

At 274 the controller 170 calculates transfer case input torque using engine output torque, the gear ratio of the transmission, and current torque ratio produced by the torque converter 167. The torque ratio produced by the torque converter is determined directly from the current speed ratio produced by the torque converter, the ratio of the torque converter turbine speed TSS. Speed sensor 168 produces a signal representing the torque converter turbine speed, and speed sensor 171 produces a signal representing engine speed.

Next, at step 276 the controller calculates the magnitude of power input at clutch 200, which is the product of the transfer case input torque and the speed of the input element 82 of the transfer case clutch, i.e., the speed of output 58. Alternatively the controller calculates the speed of the input element 82 of the transfer case clutch 100 from the turbine speed sensor 168 signal, the current transmission gear ratio and the current gear ratio produced by the transfer case gearset 44.

Then, at 278 the output torque at the transfer case clutch 100 is calculated as the product of the hydraulic pressure at the clutch and the clutch gain. The magnitude of pressure in the clutch servo 262 is an input to the controller from a pressure sensor at the servo 262 or is known from the current commanded duty cycle (dc_cmd) and the pressure of the pressure source. The controller memory 172 contains the values of clutch gain, which is the product of the average coefficient of friction of a clutch friction disc 88-spacer plate 86 pair, the number of such pairs of discs and plates, the effective friction area of a pair of discs and plates, and the effective radius of the frictional area from the clutch axis of rotation. Generally the clutch gain is in the range 2-5 foot-pounds/psi. The clutch servo fluid pressure is known to the controller 170 from the current commanded clutch duty cycle or a measured input to the controller.

Next the controller 170 calculates at step 280 the power output by the transfer case clutch 100. Clutch output power is the product of the output torque at the clutch and the speed of the clutch output, which is the speed of the output shaft 58 minus the slip across clutch 100.

The controller calculates at step 282 the heat power dissipated by clutch 100 as the difference between the transfer case clutch input power and the clutch output power. Then the controller integrates the heat power dissipated by clutch 100 over the period of each execution loop, approximately 8 milliseconds, to determine the heat energy input to the transfer case clutch during the current execution loop. The thermal mass of the clutch 100 is a known constant stored in memory 172.

The controller divides the heat energy input to the clutch during the current execution loop by the thermal mass of the clutch to determine at step 284 the change of clutch temperature during the current execution loop. The controller maintains a running updated sum of clutch temperature derived from these incremental clutch temperature changes. At step 286, the temperature during the next execution loop is set equal to the current clutch temperature plus the incremental temperature of the current loop.

The clutch temperature, calculated in this way, is compared at 288 to a first, Preemptive Mode calibrated threshold temperature. If the test at 288 is true, control returns to step 272 and the steps are executed again during the next loop.

If the clutch temperature at 286 exceeds the first threshold temperature, an inquiry is made at 290 to determine whether clutch temperature is equal to or greater than an Auto Lock reference temperature, which is higher than the first threshold temperature. If the test at 290 is true, the controller produces a commanded duty cycle signal to solenoid 256, which supercedes the handling mode duty cycle, dc_hndl, increases the pressure at servo 262, and fully engages clutch 100 in the auto lock mode, wherein the transfer case operates in the 4×4 High range. If the test at 290 is false, at 294 the controller produces a command to enter the preemptive handling mode, causing the traction mode commanded duty cycle to control operation of clutch 100.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A method for controlling a clutch that driveably connects an input and an output, comprising the steps of:
   producing input torque at the clutch;
   operating the clutch partially engaged;
   determining the current clutch slip;
   establishing a first desired portion of the input torque to be transmitted by the clutch to the output;
   determining a first magnitude of clutch torque corresponding to the first desired portion;
   determining a second magnitude of clutch torque to be transmitted to the output in proportion to the current clutch slip;
   changing the magnitude of torque transmitted by the clutch to the sum of the first and second magnitudes;
   calculating a temperature of the clutch;
   establishing a reference clutch temperature;
   comparing the calculated clutch temperature and reference clutch temperature; and
   if the calculated clutch temperature equals or exceeds the reference clutch temperature, then increasing the degree of clutch engagement sufficiently to reduce the calculated temperature of the clutch.

2. The method of claim 1, wherein the step of then increasing the degree of clutch engagement over a period sufficient to reduce the calculated temperature of the clutch includes the step of fully engaging the clutch.

3. The method of claim 1, wherein the step of calculating the temperature of the clutch, includes the steps of:
   repetitively calculating the change of temperature of the clutch over successive time intervals; and
   maintaining a running total of the change of clutch temperature over each interval.

4. The method of claim 3, wherein the step of repetitively calculating the change of temperature of the clutch, includes the steps of:
   repetitively calculating the differential change in power transmitted by the clutch over successive intervals;
   determining the thermal mass of the clutch; and
   dividing the differential change in power transmitted by the clutch over an interval by the thermal mass of the clutch.

5. The method of claim 4, wherein the step of repetitively calculating the differential change in power transmitted by the clutch over a time interval, includes the steps of:
   repetitively determining the magnitude of power transmitted to the clutch input over successive intervals;
   repetitively determining the magnitude of power transmitted from clutch output over successive intervals; and
   repetitively calculating of the difference in the magnitude of power at the clutch input and the magnitude of power at the clutch output over each interval.

6. The method of claim 5, wherein the step of repetitively determining the magnitude of power over an interval at the clutch output, includes the steps of:
   determining the clutch gain;
   repetitively determining the magnitude of pressure at the clutch servo at successive intervals;
   repetitively determining the speed of the clutch output at successive intervals; and
   repetitively calculating the product of clutch gain, speed of the clutch output, and the magnitude of pressure at the clutch servo at each interval.

7. The method of claim 6, wherein the step of determining the clutch gain, includes the steps of:
   determining the average coefficient of friction of a friction disc-spacer plate pair located in the clutch;
   determining the number of disc-plate pairs in the clutch;
   determining the effective friction area of the disc-spacer pairs;
   determining the effective radius of the frictional area of the disc-plate pairs from the axis about which the clutch rotates; and
   calculating the product of said the average coefficient of friction, said number of disc-plate pairs, said effective friction area, and said effective radius.

8. The method of claim 1, further comprising the step of:
   establishing a threshold clutch temperature that is higher than the reference clutch temperature;
   comparing the calculated clutch temperature and threshold clutch temperature; and
   if the calculated clutch temperature equals or exceeds the threshold clutch temperature, then fully engaging the clutch.

9. In a transfer case having first and second outputs, a system for controlling a clutch that driveably connects the first output and second output, comprising:

means for operating the clutch partially engaged;
means for calculating the temperature of the clutch;
establishing a reference clutch temperature;
means for comparing the calculated temperature of the clutch and reference clutch temperature; and
means for producing an output signal for increasing the degree of clutch engagement sufficiently to reduce the calculated temperature of the clutch, if the calculated temperature of the clutch equals or exceeds the reference clutch temperature.

10. The system of claim 9, wherein the output signal producing means fully engages the clutch if the calculated temperature of the clutch equals or exceeds the reference clutch temperature.

11. The system of claim 9, further comprising:
a fluid pressure source;
a servo through which the clutch is alternately pressurized and vented to engage and disengage the clutch; and
a solenoid communicating with the output producing means for increasing a magnitude of pressure in the servo in responsive the output signal.

* * * * *